US008417658B2

(12) United States Patent
Arnold et al.

(10) Patent No.: US 8,417,658 B2
(45) Date of Patent: Apr. 9, 2013

(54) DEPLOYMENT PATTERN REALIZATION WITH MODELS OF COMPUTING ENVIRONMENTS

(75) Inventors: William C. Arnold, Mahopac, NY (US); Tamar Eilam, New York, NY (US); Michael H. Kalantar, Chapel Hill, NC (US); Alexander V. Konstantinou, New York, NY (US); Alexander A. Totok, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/210,139

(22) Filed: Sep. 12, 2008

(65) Prior Publication Data

US 2010/0070449 A1   Mar. 18, 2010

(51) Int. Cl.
*G06F 17/00* (2006.01)
*G06N 5/02* (2006.01)

(52) U.S. Cl.
USPC .............................. 706/48; 716/136; 701/100

(58) Field of Classification Search ...................... 706/48
See application file for complete search history.

(56) References Cited

U.S. PATENT DOCUMENTS

| | | | |
|---|---|---|---|
| 5,950,011 A | 9/1999 | Albrecht et al. |
| 5,970,490 A | 10/1999 | Morgenstern |
| 6,256,773 B1 | 7/2001 | Bowman-Amuah |
| 6,629,065 B1 | 9/2003 | Gadh et al. |
| 6,701,514 B1 | 3/2004 | Haswell et al. |
| 6,789,054 B1 | 9/2004 | Makhlouf |
| 6,795,089 B2 | 9/2004 | Rajarajan et al. |
| 7,050,872 B2 | 5/2006 | Matheson |
| 7,069,541 B2 | 6/2006 | Dougherty et al. |
| 7,069,553 B2 | 6/2006 | Narayanaswamy et al. |
| 7,103,874 B2 | 9/2006 | McCollum et al. |
| 7,134,122 B1 | 11/2006 | Sero et al. |
| 7,196,712 B2 | 3/2007 | Rajarajan et al. |
| 7,320,120 B2 | 1/2008 | Rajarajan et al. |
| 7,370,315 B1 | 5/2008 | Lovell et al. |
| 7,463,263 B2 | 12/2008 | Gilboa |

(Continued)

OTHER PUBLICATIONS

T. Eilam et al.; Reducing the Complexity of Application Deployment in Large Data Centers; Proceedings of the 9th IFIP/IEEE International Symposium on Integrated Network Management (IM '2005); May 15-19, 2005; pp. 221-234; Nice, France.

(Continued)

*Primary Examiner* — Kakali Chaki
*Assistant Examiner* — Kalpana Bharadwaj
(74) *Attorney, Agent, or Firm* — Stevens & Showalter LLP (57) ABSTRACT

Deployment pattern matching is implemented by accessing a target computing environment model that captures environment modeling parameters relating to resources and resource-resource relationships of a corresponding computing environment and expressing the target computing environment model as a model graph defined by target resource elements and resource-to-resource relationship links. Deployment pattern matching is further implemented by accessing a realization pattern that captures deployment parameters relating to resources and resource-resource relationships of a deployment of interest and expressing the realization pattern as a pattern graph defined by conceptual resource elements and constraints arranged by resource-to-resource relationship links and constraint links. The realization pattern is then evaluated against the target computing environment model by executing at least one pattern matching algorithm that attempts to match the pattern graph to the model graph and information corresponding to results of the evaluation are conveyed.

9 Claims, 7 Drawing Sheets

U.S. PATENT DOCUMENTS

| | | | |
|---|---|---|---|
| 7,568,019 | B1 | 7/2009 | Bhargava et al. |
| 7,630,877 | B2 | 12/2009 | Brown et al. |
| 7,643,597 | B2 | 1/2010 | Liu et al. |
| 7,665,085 | B2 | 2/2010 | Sundararajan et al. |
| 7,669,137 | B2 | 2/2010 | Chafe et al. |
| 7,735,062 | B2 | 6/2010 | de Seabra e Melo et al. |
| 7,779,383 | B2 | 8/2010 | Bornhoevd et al. |
| 7,900,201 | B1 | 3/2011 | Qureshi et al. |
| 7,962,891 | B2 | 6/2011 | Kimelman et al. |
| 2003/0037327 | A1 | 2/2003 | Cicciarelli et al. |
| 2003/0084156 | A1 | 5/2003 | Graupner et al. |
| 2003/0163450 | A1 | 8/2003 | Borenstein et al. |
| 2004/0179011 | A1 | 9/2004 | Marshall |
| 2005/0055692 | A1 | 3/2005 | Lupini et al. |
| 2005/0198244 | A1* | 9/2005 | Eilam et al. ............. 709/223 |
| 2006/0053410 | A1 | 3/2006 | Charisius et al. |
| 2006/0066627 | A1 | 3/2006 | Gerhard et al. |
| 2006/0101091 | A1 | 5/2006 | Carbajales et al. |
| 2006/0101445 | A1 | 5/2006 | Carbajales et al. |
| 2006/0235733 | A1 | 10/2006 | Marks |
| 2006/0271909 | A1 | 11/2006 | Huang et al. |
| 2007/0074203 | A1 | 3/2007 | Curtis et al. |
| 2007/0168925 | A1 | 7/2007 | Bornhoevd et al. |
| 2007/0179823 | A1 | 8/2007 | Bhaskaran et al. |
| 2007/0277151 | A1 | 11/2007 | Brunel et al. |
| 2007/0288885 | A1 | 12/2007 | Brunel et al. |
| 2008/0028365 | A1 | 1/2008 | Erl |
| 2008/0082959 | A1 | 4/2008 | Fowler |
| 2008/0127049 | A1 | 5/2008 | Elaasar |
| 2008/0183725 | A1 | 7/2008 | Blakeley et al. |
| 2008/0313008 | A1 | 12/2008 | Lee et al. |
| 2008/0313595 | A1 | 12/2008 | Boulineau et al. |
| 2008/0313596 | A1 | 12/2008 | Kreamer et al. |
| 2009/0006069 | A1* | 1/2009 | Alam et al. ............. 703/22 |
| 2009/0007062 | A1 | 1/2009 | Gilboa |
| 2009/0012842 | A1 | 1/2009 | Srinivasan et al. |
| 2009/0044170 | A1 | 2/2009 | Bernardi et al. |
| 2009/0077621 | A1 | 3/2009 | Lang et al. |
| 2009/0132562 | A1 | 5/2009 | Mehr et al. |
| 2009/0171993 | A1 | 7/2009 | Arthursson |
| 2009/0249281 | A1 | 10/2009 | Fritzsche et al. |
| 2009/0278847 | A1 | 11/2009 | Berg et al. |
| 2009/0319239 | A1 | 12/2009 | Arnold et al. |
| 2009/0319467 | A1 | 12/2009 | Berg et al. |
| 2010/0030893 | A1 | 2/2010 | Berg et al. |
| 2010/0031247 | A1 | 2/2010 | Arnold et al. |
| 2010/0058331 | A1 | 3/2010 | Berg et al. |
| 2010/0077328 | A1 | 3/2010 | Berg et al. |
| 2010/0083212 | A1 | 4/2010 | Fritzsche et al. |
| 2010/0138795 | A1 | 6/2010 | Berg et al. |
| 2011/0016074 | A1 | 1/2011 | Berg et al. |
| 2011/0029967 | A1 | 2/2011 | Berg et al. |

OTHER PUBLICATIONS

D. Corneil et al.; An Efficient Algorithm for Graph Isomorphism; Journal of the ACM; Jan. 1970; pp. 51-64; vol. 17.

J. Ullman; An Algorithm for Subgraph Isomorphism; Journal of the ACM; Jan. 1976; pp. 31-42; vol. 23, No. 1.

G. Gati; Further Annotated Bibliograpy on the Isomorphism Disease; Journal of Graph Theory; 1979; pp. 96-109; vol. 3; John Wiley & Sons, Inc.

W. Tsai et al.; Error-correcting Isomorphisms of Attributed Relational Graphs for Pattern Alalysis; IEEE Transactions on Systems, Man, and Cybernetics; Dec. 1979; pp. 757-768; vol. SMC-9, No. 12.

Kodali, Raghu; What is service-oriented arthitecture?; Java World; "http://www.javaworld.com/javaworld/jw-06-2005/jw-0613-soa.html"; Jun. 2006; pp. 1-5.

Parikh and Gurajada; "SOA for the Real World"; Java World; "http://www.javaworld.com/javaworld/jw-11-2006/jw-1129-soa.html"; Nov. 2006; pp. 1-3.

Erl, Thomas; "Introducing SOA Design Patterns", SOA World Magazine; vol. 8, Issue 6; Jun. 2008; pp. 2-7.

Issac Tuku Tecklu; Notice of Allowance and Fees Due; U.S. Appl. No. 12/181,737; Jun. 13, 2012; United States Patent and Trademark Office, all pages.

Patel, Chirag: Office Action in U.S. Appl. No. 12/494,374; Apr. 19, 2011; U.S. Patent and Trademark Office; Alexandria, VA; pp. 1-13.

Patel, Chirag: Office Action in U.S. Appl. No. 12/494,374; Oct. 6, 2011; U.S. Patent and Trademark Office; Alexandria, VA; pp. 1-10.

Patel, Chirag; Office Action in U.S. Appl. No. 12/494,374; Mar. 1, 2012; U.S. Patent and Trademark Office; Alexandria, VA; pp. 1-25.

Tecklu, Isaac Tuku; Office Action in U.S. Appl. No. 12/181,737; Feb. 24, 2012; U.S. Patent and Trademark Office; Alexandria, VA; pp. 1-15.

Hanchak, Walter P.; Office Action in U.S. Appl. No. 12/504,511; Jan. 4, 2012; U.S. Patent and Trademark Office; Alexandria, VA; pp. 1-36.

Peiris, Mulder, Cicoria, Bahree and Paathek, Pro WCF Practical Microsoft SOA Implementation; APRESS, Berkeley, CA; 2007; pp. 1-506.

Bhargava, Anil; Office Action in U.S. Appl. No. 12/325,664; Mar. 25, 2011; U.S. Patent and Trademark Office; Alexandria, VA; pp. 1-25.

Bhargava, Anil; Office Action in U.S. Appl. No. 12/325,664; Aug. 26, 2011; U.S. Patent and Trademark Office; Alexandria, VA; pp. 1-23.

Yuen, Ketih Chi Hang; Office Action in U.S. Appl. No. 12/200,720; Nov. 21, 2011; U.S. Patent and Trademark Office; Alexandria, VA; pp. 1-28.

Calle, Angel; Office Action in U.S. Appl. No. 12/141,655; Feb. 17, 2011; U.S. Patent and Trademark Office; Alexandria, VA; pp. 1-24.

Calle, Angel; Office Action in U.S. Appl. No. 12/141,655; Aug. 29, 2011; U.S. Patent and Trademark Office; Alexandria, VA; pp. 1-16.

William C. Arnold et al.; U.S. Appl. No. 13/435,506, filed Mar. 30, 2012; entitled "Simplified Deployment Modeling"; application pp. 1-43; drawings pp. 1-16.

W. Arnold et al.; Pattern Based SOA Deployment; Proceedings of the 5th International Conference on Service-Oriented Computing (ICSOC '2007); Sep. 17-20, 2007; Vienna, Austria; Lecture Notes in Computer Science (LNCS); vol. 4749; Springer 2007; pp. 1-12.

B.T. Messmer; Efficient Graph Matching Algorithms; PhD Thesis; University of Bern; Switzerland; Nov. 1995; pp. 1-169.

U.S. Appl. No. 12/181,737, filed Jul. 29, 2008 entitled, "Simplified Deployment Modeling"; Application pp. 1-49; Drawing pp. 1-16.

* cited by examiner

DEPLOYMENT PATTERN REALIZATION WITH MODELS OF COMPUTING ENVIRONMENTS

BACKGROUND OF THE INVENTION

The present invention relates to systems, methods and computer program products for implementing pattern matching capabilities within models of computing environments.

In a typical application development environment, software architects create software applications using conventional development tools. However, the development environment from which a new application is developed is often different from an operations environment, e.g., a data center, which deploys the developed applications. In this regard, architects within the operations environment are typically burdened with the responsibility of carrying the developed application into operations. However, the architects within the operations environment often do not have first-hand knowledge of the developed artifacts, e.g., the details, requirements specifications, configuration, etc., associated with the application to be deployed.

Accordingly, in a deployment planning process, computing information technology (IT) environments may be represented by semantically rich models that describe resources available within the IT environment, and further describe resource-resource relationships of the modeled resources. Modeled resources may include for example, hardware and/or software. Correspondingly, resource-resource relationships may include, for example, environment characteristics that describe the association between two or more modeled resources using descriptions such as 'installed on', 'running on', 'dependent upon', 'member of', etc. In this regard, computing environment models may be used to represent actual (existing) computing environments. Computing environment models may also be used to capture deployment patterns representing a template of a distributed IT solution, a desired state of a computing environment or aspect thereof.

BRIEF SUMMARY OF THE INVENTION

According to aspects of the present invention, systems, methods and computer program products are provided for implementing deployment pattern matching within models of a computing environment. Deployment pattern matching is implemented by accessing a target computing environment model that electronically captures environment modeling parameters relating to resources and resource-resource relationships of a corresponding computing environment and expressing the target computing environment model as a model graph defined by target resource elements and resource-to-resource relationship links.

Deployment pattern matching is further implemented by accessing a realization pattern that electronically captures deployment parameters relating to resources and resource-resource relationships of a deployment of interest and expressing the realization pattern as a pattern graph defined by conceptual resource elements and constraints arranged by resource-to-resource relationship links and constraint links. The realization pattern is then evaluated against the target computing environment model by executing at least one pattern matching algorithm that attempts to match the pattern graph to the model graph. Information corresponding to results of the evaluation is then conveyed to a suitable destination.

DETAILED DESCRIPTION OF THE INVENTION

According to aspects of the present invention, pattern matching capabilities are provided to determine whether a model of a computing environment contains a sub-model that realizes, i.e., matches, a pattern of interest. In general, such problems will be referred to herein as Deployment Pattern Matching problems. For example, a pattern of interest may comprise a given information technology (IT) solution template, e.g., a template that defines the hardware, software and relationships necessary to deploy a given solution. A pattern of interest may also be utilized to specify a deployment compliance pattern, such as a pattern that defines hardware and software necessary for some specified compliance criteria. In this regard, more complex compliance requirements may be specified by a composition of two or more compliance patterns. Accordingly, such pattern matching capabilities may be utilized, for example, in the context of deployment planning as will be described in greater detail herein.

Pattern realization (a "pattern match") according to aspects of the present invention, may be acknowledged in certain applications if a sub-model within a target computing environment model contains a designated pattern of interest. Alternatively a match may be realized in certain applications if a sub-model within a target computing environment contains part of the pattern of interest. Still further, a match may be realized in certain applications if a sub-model within a target computing environment contains a composition of several patterns that are of interest.

To facilitate a description of the pattern realization capabilities herein, the term "realization pattern" will be used to refer to a deployment pattern utilized for purposes of pattern matching with regard to a corresponding target computing environment model. In this regard, the realization pattern may be comprised of one or more existing/previously created deployment patterns, or parts thereof, e.g., derived from a single defined deployment pattern, derived from part of a single deployment pattern, derived from a plurality of deployment patterns, derived from parts from a plurality of deployment patterns, etc. For example, the deployment patterns or components thereof utilized to define the realization pattern 114 may be implemented as (IT) solution templates as noted above. Moreover, the realization pattern 114 may be uniquely created for purposes of pattern matching, or the realization pattern 114 may be derived by modifying one or more existing/previously created deployment patterns.

For example, to facilitate successful deployment of a computing environment capability, it may be necessary to confirm that an operations center meets certain defined compliance criteria. In this regard, a computing environment model of the operations center may be analyzed to determine whether a realization pattern, e.g., a deployment compliance pattern corresponding to the defined compliance criteria, is realized within the operations center model. As another illustrative example, the computing environment model of the operations center may be analyzed to determine whether instances of one or more realization patterns corresponding to undesirable deployment patterns can be identified.

As yet another illustrative example, pattern realization capabilities described more fully herein may be used to verify whether an existing computing environment contains a set of resources that matches a given deployment pattern, a composition of several deployment patterns, etc. In other words, a target computing environment model may be utilized to determine whether a given deployment pattern or composition of two or more deployment patterns or parts thereof, is satisfied in a given existing computing environment.

According to further aspects of the present invention, determinations may be made as to whether a model of an existing computing environment contains resources that match a desired realization pattern. By making such a determination, resources characterized in the realization pattern that are missing in the modeled computing environment can be identified so that descriptions (models) of the identified missing resources can be added to the computing environment model and the missing resources themselves can be installed into the corresponding computing environment, e.g., using a predefined set of installables, instantiated from virtual machine images, or configured using a predefined set of configuration actions on the existing software resources, etc.

Figure 1:
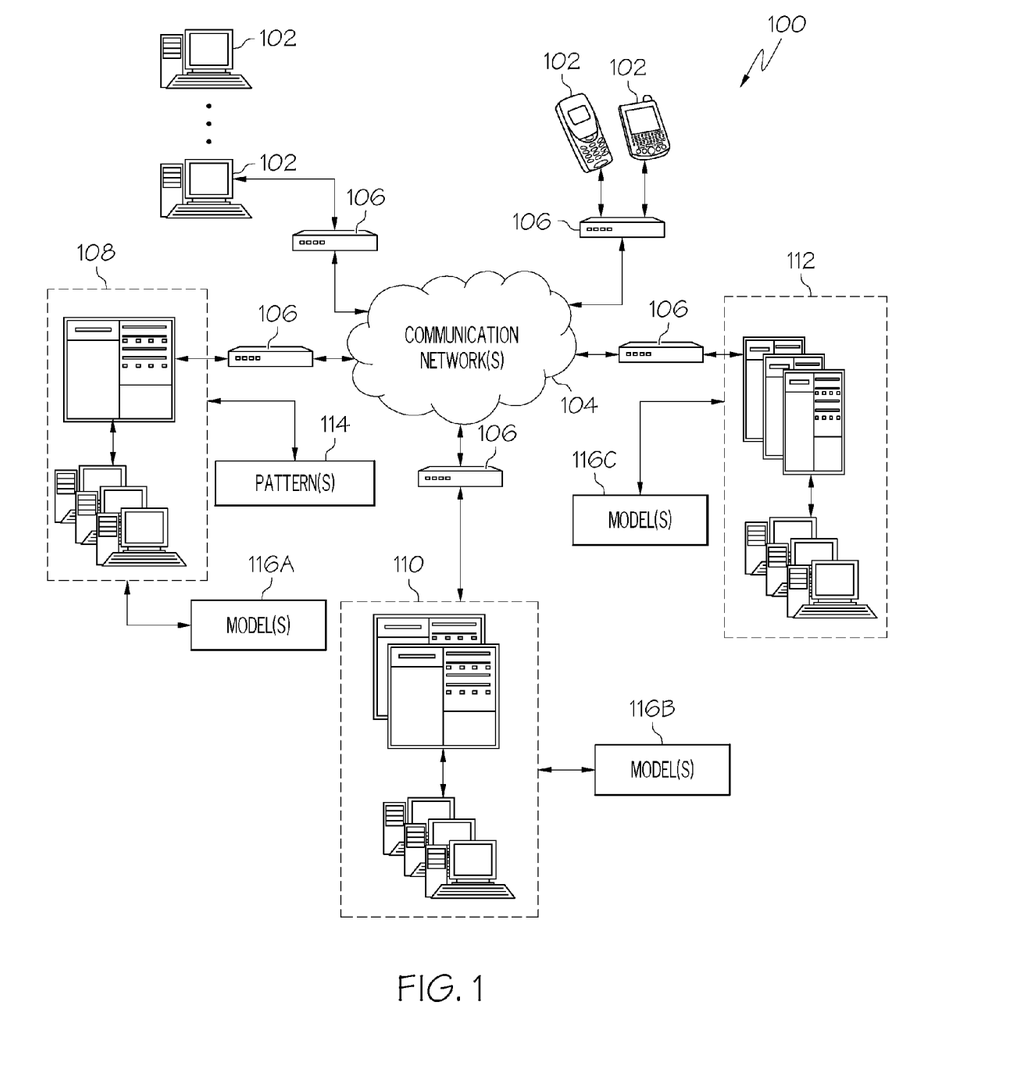
FIG. 1 is a schematic illustration of an exemplary computing system that supports deployment pattern realization with models of computing environments according to various aspects of the present invention.

Referring now to the drawings and particularly to FIG. 1, a general diagram of a distributed computing environment 100 is illustrated according to various aspects of the present invention. The computing environment 100 comprises a plurality hardware and/or software processing devices 102 that are linked together by a network 104. Typical processing devices 102 may include servers, personal computers, notebook computers, transactional systems, purpose-driven appliances, pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that interact with various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, dedicated appliances, network interfaces wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc.

Three exemplary logical groupings 108, 110, 112 of computing devices 102 are illustrated for the purpose of facilitating a discussion of aspects of the present invention, as set out in greater detail herein. However, this exemplary grouping should not be construed by any means as limiting in any way as to the aspects of the present invention. Rather, it provides a simplified structure from which to discuss certain aspects of the present invention.

Assume for example, that the first logical grouping 108 represents a software development environment used by software developers and architects, e.g., to develop IT solutions such as applications that implement workflows defined by corresponding business processes. As an illustrative example, software architects may develop an IT solution that comprises complex composites of multiple interdependent components that collectively implement flows of a predefined business process to be automated. As such, before final deployment, software architects may want to ensure that the various deployment targets are capable of supporting the developed IT solution. According to aspects of the present invention, the software architects may create or otherwise define a realization pattern 114 that describes, for example, the hardware and software resources, relationships, requirements and capabilities that are necessary for the successful deployment of the developed IT solution. In this regard, the realization pattern 114 can be matched against target computing environment models as described more fully herein.

The software development environment may be modeled by a first computing environment model 116A that models the complete resources, requirements and capabilities of the processing devices 102 within the first logical grouping 108. Since the IT solution was developed within the software development environment, it may be possible to derive the realization pattern 114, for example, from those resources of the first computing environment model 116A that are necessary for the developed IT solution to execute/run.

In this regard, computing environment models, designated generally by the reference numeral 116, may be derived in any practical manner. For example, such computing environment models may be static models obtained by periodically running "infrastructure resource discovery" mechanisms, i.e., "cached" models. As another illustrative example, computing environment models may comprise lightweight models that query/discover a corresponding computing environment dynamically on demand.

Keeping with the current example, further assume that the second logical grouping 110 comprises a testing center modeled by a second computing environment model 116B that models the resources, relationships, requirements and capabilities of the processing devices 102 within the second logical grouping 110. Still further, assume that the third logical grouping 112 comprises a production data center modeled by a third computing environment model 116C that models the resources, relationships, requirements and capabilities of the processing devices 102 within the third logical grouping 112.

The testing center and/or production data center, corresponding to logical groupings 110, 112, must support the requirements of the business process in order to deploy the corresponding developed IT solution. As such, the test center and production data center must be configured or configurable to meet the needs of the business process. Alternatively, software and/or hardware may be required to be added to the testing center and/or production data center to ensure compatibility between the business process and corresponding test center and/or production data center. According to aspects of the present invention, the realization pattern 114 may be utilized to define those resources necessary for successful deployment of the developed IT solution. In this regard pattern matching capabilities described more fully herein are utilized to determine whether the pattern 114 is realized by the target computing environment models 116B and/or 116C.

A located pattern match may thus suggest that the testing center and/or production data center can successfully deploy the IT solution. Alternatively, lack of a match may identify the resources or resource relationships that need to be added and/or modified within the associated target computing environment to enable successful deployment of the IT solution. Still further, lack of a match may indicate problems with deployment of the IT solution at the testing center and/or production data center, thus requiring that the IT solution, the target computing environment, the underlying business process or a combination thereof must be re-architected.

Reference herein to an IT architect, a software architect and/or a solutions architect are meant to imply "user roles" of individuals interacting with various aspects of the present invention. In this regard, the terms are not meant to require or imply independent and individual persons or predefined separate environments, but rather the role/part/nature of assigned tasks being performed. Similarly, although illustrated as distinct, the three logical groupings 108, 110 and 112 are meant to imply computing environments that support "environmental roles". In this regard, the environments do not require or imply discrete separately located resources, although they may be in practice. Still further, the various processing devices within the computing environment need not be under the control of a single enterprise. Rather, multiple enterprises may be interconnected via the network 104 to realize the computing environment 100.

Although a business process may be tested, e.g., at the test center 110 (if implemented), to verify that the developed software is functional as intended by design for implementing the corresponding business process, problems may still persist in the successful deployment of the application. For example, each component of an application to be deployed at a production data center (or testing environment) is likely to have specific hosting and dependency requirements that are functional. As such, IT architects, solutions architects, etc., must manage their hardware and/or software resources to meet these functional requirements to ensure successful deployment of the IT solution at each target deployment site. This can be a time consuming task, which may eventually lead, as noted above, to a requirement to re-architect the production data center and/or IT solution and/or underlying business process.

For example, the production data center selected for deployment of the application may not have the required version of a software component to deploy the developed IT solution, e.g., the wrong version or type of a Java JDBC Datasource, Java JDBC Driver Provider etc. As further examples, the operations environment 112 may not support the required software such as a required database server, Java application server, operating system, etc. Still further, the operations environment may not support the physical requirements of the application, e.g., memory required by the application as architected.

However, according to various aspects of the present invention, systems, methods and computer program products are provided for realizing (matching) a pattern to one or more target computing environment models. In this regard, the pattern may comprise for example, a deployment pattern that represents a template of a desired state of a computing environment necessary to deploy a given IT solution. Accordingly, successful deployments may be realized, and necessary installables, upgrades and other modifications may be identified (where necessary) in an appropriate manner.

Figure 2:
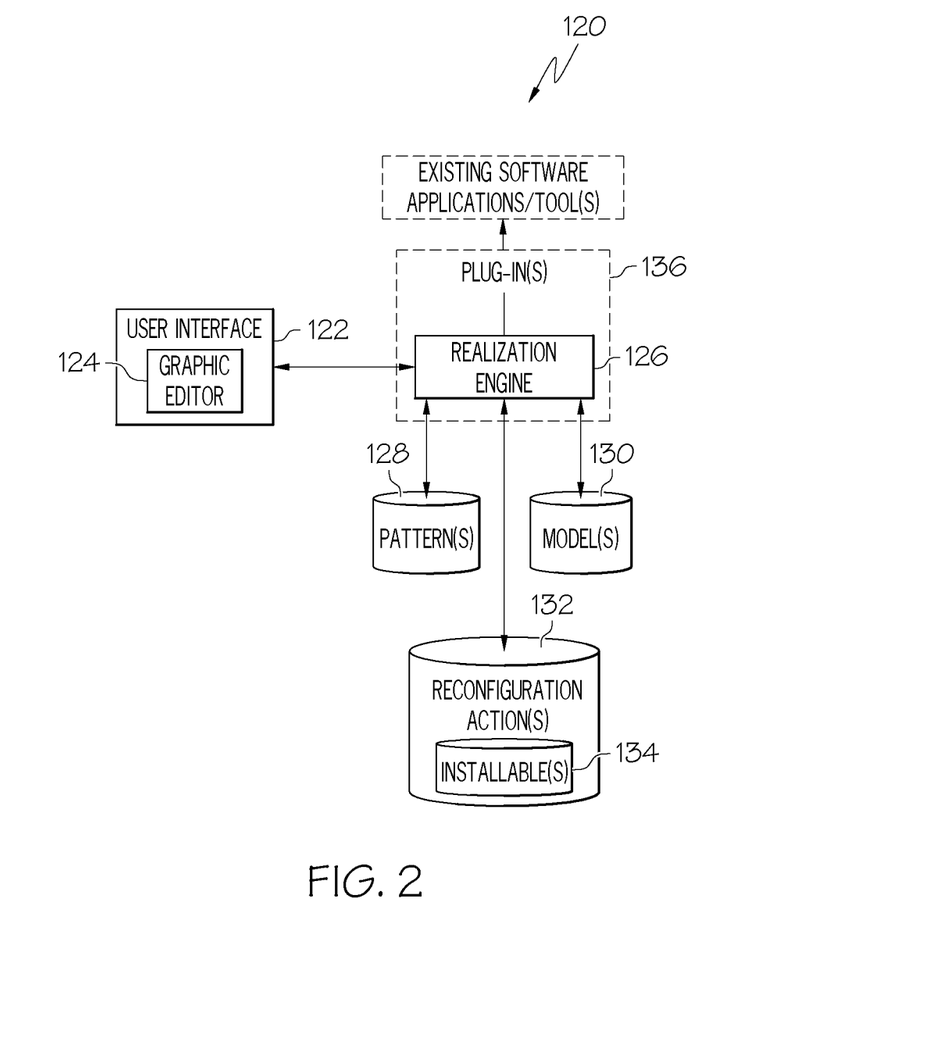
FIG. 2 is a block diagram of components for implementing pattern realization with computing environment models according to aspects of the present invention.

Referring to FIG. 2, a block diagram of a pattern realization tool 120 is illustrated for performing pattern realization according to various aspects of the present invention. In this regard, the pattern realization tool 120 may be implemented as a computer program product, as computer code that integrates into other, existing applications and/or computing environment tools. In general, a graphical user interface 122 includes a graphic editor 124 that allows an operator to define realization patterns 114, select target computing environment models 116, and perform pattern realization and other necessary functions.

A pattern realization engine 126 performs pattern realization based on parameters specified, for example, by a user interacting with the graphical user interface 122. Although shown as a separate component for clarity of discussion, the pattern realization engine 126 may be implemented in any practical manner to implement the functions of pattern matching as set out in greater detail herein. As such, the pattern realization engine 126 may be implemented as an algorithm, a collection of algorithms, as part of another process or any other practical implementation.

To facilitate interaction, the pattern realization engine 126 may utilize a pattern data source 128. For example, the pattern data source 128 may be implemented as a library of deployment patterns. By storing deployment patterns as a library or in some other manageable form, existing patterns may serve as realization patterns for use directly, or as templates for the creation of subsequent realization patterns. In this regard, existing patterns may be easily retrieved for processing. Moreover, patterns may be used as starting points to more readily create or otherwise build new patterns. For example, different patterns may define different aspects of IT solution requirements, compliance criteria, an out of compliance specification, etc., which can be composed together into a new pattern.

A user interacting with the graphic editor 124 may retrieve one or more patterns and/or create new patterns. The newly created patterns may then be saved to the pattern data source 128. Accordingly, as noted herein, the realization patterns 114 used for pattern matching may be derived from an existing pattern, from part of an existing pattern, from multiple patterns, from parts of multiple patterns, etc. The realization patterns 114 may then be saved as patterns themselves, etc.

Correspondingly, models 116 of computing environments may be stored in a model data source 130. Still further, data regarding available infrastructure reconfiguration actions may be stored in a suitable reconfiguration actions data source 132, e.g., as a library of infrastructure reconfiguration actions. As will be described in greater detail herein, a particular subset of reconfiguration actions includes installable reconfiguration actions. As such, for purposes of clarity of discussion herein, a library of installables is shown in an installables data source 134, which may be conceptually treated as a subset of infrastructure reconfiguration actions.

According to various aspects of the present invention, the pattern realization tool 120 may be implemented as a computer program product that integrates into other, existing applications and/or computing environment tools, etc. As a few illustrative examples, the pattern realization tool may be implemented using Eclipse by Eclipse Foundation, Inc. of Portland, Oreg. or Rational Software Modeler by International Business Machines of Armonk, N.Y., etc. In this regard, in order to facilitate the pattern matching capabilities described more fully herein, Eclipse, Rational, etc., can be extended with one or more plug-ins 136 to collectively implement the realization engine 126.

Figure 3:
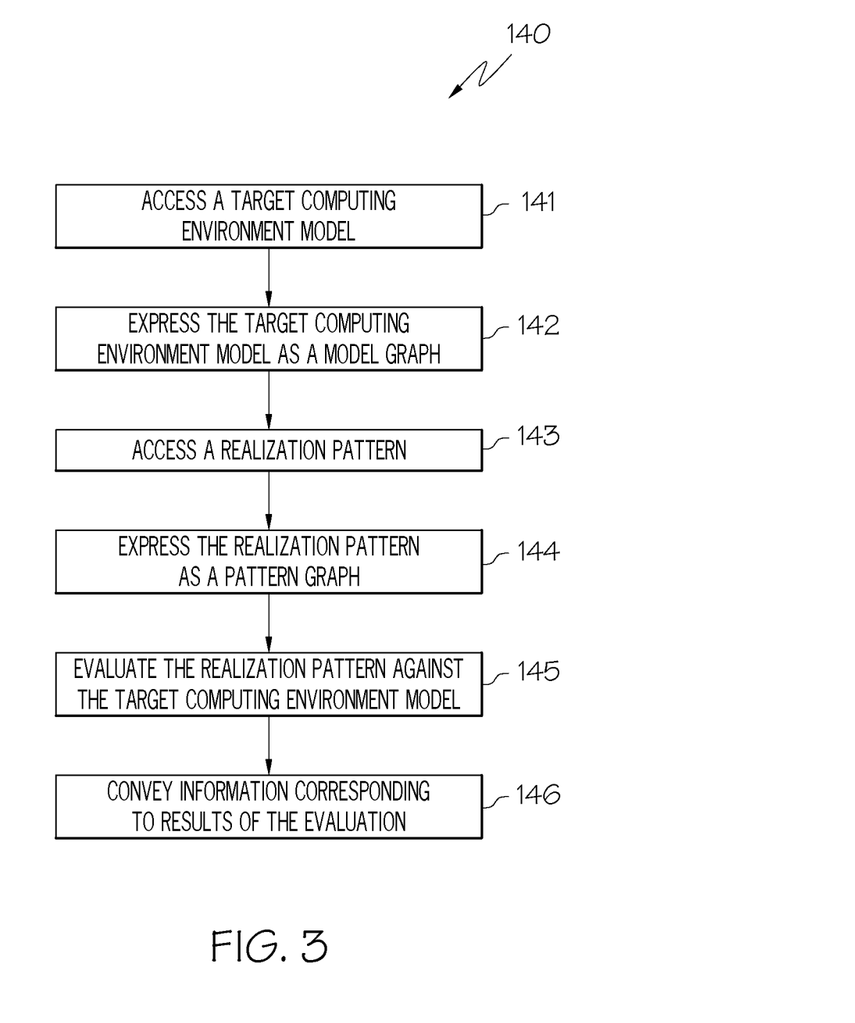
FIG. 3 is a flow chart illustrating a method of implementing deployment pattern matching within models of computing environment according to various aspects of the present invention.

Referring to FIG. 3, a flow 140 illustrates a method/process of implementing deployment pattern matching within models of computing environment according to various aspects of the present invention. A target computing environment model is accessed at 141. The target computing environment model electronically captures environment modeling parameters relating to resources and resource-resource relationships of a corresponding computing environment as described more fully herein, e.g., with reference to target computing environment models 116. The target computing environment model is expressed as a model graph at 142, which is defined, for example, by target resource elements and resource-to-resource relationship links. Model graphs are described in greater detail herein.

A realization pattern is accessed at 143. The realization pattern electronically captures deployment parameters relating to resources and resource-resource relationships of a deployment of interest as described more fully herein, e.g., with reference to realization patterns 114. The realization pattern is expressed as a pattern graph at 144, which is defined, for example, by conceptual resource elements and constraints arranged by resource-to-resource relationship links and constraint links. Pattern graphs will also be described in greater detail herein.

The realization pattern is then evaluated against the target computing environment model by executing at least one pattern matching algorithm that attempts to match the pattern graph to the model graph. For example, a processing device 102 executing the realization engine 126 or components thereof may execute an appropriate pattern matching algorithm. Information corresponding to results of the evaluation is then conveyed. Conveyance may comprise, for example, interacting with the user interface 122 to provide appropriate feedback to the user as to the success or failure of the pattern matching process.

In the flow 140, the expression of the realization pattern to a pattern graph and/or the expression of the target computing environment model as a model graph may be conceptual if the realization pattern 114 and/or target computing environment model 116 are already is a graph format.

As noted above, according to various aspects of the present invention, a realization pattern 114 may be captured as a pattern graph. For example, a given realization pattern 114 may be captured as a typed (labeled) graph representing a template of a distributed IT solution, a desired state of a subset of an arbitrary computing environment and/or model, etc. Similarly, according to various aspects of the present invention, IT environments, including actual realized environments and/or yet to be realized environments are represented by semantically rich models 116 that are captured as labeled/typed model graphs that model resources and resource-resource relationships.

Under this arrangement, typed nodes may represent elements, including resources such as hardware and/or software in a corresponding computing environment. Correspondingly, typed edges may represent resource-resource relationships that characterize relationships between elements represented as nodes, such as 'installed on', 'running on', 'dependent upon', 'member of', etc. Other representations with similar expressiveness may be used as an alternative to a typed graph for the pattern and/or model graph representations.

Moreover, nodes and edges of the pattern graph characterizing the realization pattern 114 may contain additional (declarative) constraints that impose certain restrictions on the resources represented by the realization pattern 114 and/or on the relationships between different resources. For example, constraints may be defined on desired values of the physical infrastructure attributes, structural constraints representing additional restrictions on the mutual location and relationships between target physical computing environment resources. As a few illustrative examples, constraints that may be included in a realization pattern 114 may include a collocation constraint, an anti-collocation constraint, deferred hosting constraint and/or domain-specific constraints on the target computing environment model 116.

Under this arrangement, one or more pattern realization problems are formalized as one or more corresponding pattern matching problems, which may be described as graph matching problems, examples of which are described in greater detail herein. The realization engine 126 identifies a realization pattern 114, e.g., as derived from one or more patterns stored in the pattern data source 128 and identifies one or more computing environment models, e.g., as stored in the model storage 130. The realization engine 126 then performs pattern matching as set out more fully herein, e.g. by executing one or more graph matching algorithms based upon the corresponding pattern graph and model graph. In performing pattern matching, any constraints defined for the realization pattern 114 may be validated against the resources in target computing environment model 116.

Moreover, the results of pattern matching may be conveyed, e.g., to the graphical user interface 122 or other suitable destination. The conveyed results may indicate success or failure at pattern matching. The conveyed results may also identify aspects of the realization pattern not located, e.g., which can then be utilized to drive a workflow to install missing aspects in the examined model and/or corresponding deployment environment, etc.

Pattern Matching:

As noted in greater detail herein, according to various aspects of the present invention, the definition of pattern matching may be specified in different terms, depending, for example, upon the requirements of a corresponding task. As an illustrative example, a realization pattern 114, which may itself be comprised of all or part of one or more other patterns, may be recognized in a target computing environment model 116 if elements and their relationships in the realization pattern 114 map to (are realized by) elements and relationships in the target computing environment model 116. In this regard, pattern mapping may be dependent upon one or more rules for local validity of matching of a single resource in the pattern with a single resource in the target computing environment model.

For example, in general terms, local realization rules may be utilized to define the validity of the realization of a "unit" by another unit that takes into account only information about the given two units. In this regard, a local realization rule does not need to take into account the information about the rest of the realization pattern and the rest of the target computing environment models. As an illustrative example utilizing the simple case of a single-type-inheritance, unit A' is a valid realization of unit A if the type of unit A' is the same or a subtype of the unit A type.

Correspondingly, in general, global realization rules may be utilized to define validity of the realization of a set of units with another set of units that takes into account information about these units, about relationships among them, and about their relationships to the rest of the realization pattern and the rest of the target computing environment model. As an illustration, a global realization rule, referred to as the "respect the hosting link" rule is defined as follows: let unit A' realize unit A and unit B' realize unit B, where unit B is hosted on unit A; realization of unit A and unit B with unit A' and unit B' (respectively) is valid if unit B' is hosted on unit A'.

Accordingly, the implementation of pattern matching may be augmented by defining local realization rules that characterize local validity of matching a single resource in the realization pattern with a corresponding single resource in the target computing environment model, defining global realization rules for global validity of matching the realization pattern against the target computing environment model and/or defining constraint rules for validating model constraints defined on the realization pattern against resources in the target computing environment model. In this regard, the realization engine 126 may utilize at least one of the local realization rules, global realization rules and constraint rules to determine whether the realization pattern matches to the target computing environment model when evaluating the pattern graph against the model graph.

An example of specific realization logic is described in U.S. patent application Ser. No. 12/141,655, entitled "Topology Modeling Application That Handles Abstract Entities Through The Realization Of Conceptual Objects", filed on Jun. 18, 2008, the disclosure of which is hereby incorporated by reference in its entirety.

According to aspects of the present invention, a set of rules may be utilized to stipulate that global validity of matching of a pattern in a target computing environment model is satisfied. The set of rules that define global validity may be empty, i.e., there are no global realization validity rules in effect. Moreover, constraints defined in the realization pattern may be checked to determine whether the constraints are satisfied on the target computing environment model.

Elements and relationships among elements in a realization pattern, e.g., nodes and edges in pattern graph corresponding to a realization pattern 114 may be referred to herein as conceptual nodes/edges, because nodes and edges in the realization pattern may not necessarily represent existing physical resources. Conceptual nodes/edges can be mapped to target nodes/edges of an associated model graph corresponding to an associated computing environment model 116, by the means of mapping logic, which is specific to the deployment metamodel used by the system, as noted above.

As an illustrative example, a node/edge can represent an abstract and/or partial definition that can contain unfulfilled functional parameters, and is thus considered conceptual. Thus, a conceptual node/edge, which is also referred to herein generally as a conceptual object, may be used as a "preliminary placeholder" that has yet to be fully defined. The unfulfilled functional parameters can include a variety of definition elements supported by the realization engine 126, such as capabilities, requirements, and constraints of the object.

Correspondingly, nodes and edges in a target computing environment model 116 may represent real implementations, e.g., a physical deployment environment, and are referred to herein as concrete nodes/edges, because such real implementations correspond to concrete (existing) resources. In this regard, conceptual nodes/edges can be mapped to concrete nodes/edges by the means of mapping logic as noted above.

As such, when a realization relationship is able to be thoroughly processed, a conceptual node/edge of an associated realization pattern may be semantically folded into a corresponding node/edge of a corresponding target computing environment model such that the target encompasses the unfulfilled functional parameters of the conceptual node/edge.

A conceptual object can be realized or made concrete through a chain of one or more realization relationships, which connects a conceptual object to a concrete object. Additionally, realization relationships can be used to connect a conceptual object to another conceptual object. Thus, all conceptual objects can eventually be represented by concrete objects. In this regard, processing of realization relationships can include use of a set of validation rules for validation of realization relationships.

Mapping (Realization) Logic for Nodes and Edges:

According to various aspects of the present invention, mapping of a conceptual node/edge to a target node/edge, e.g., a concrete node/edge, is considered to be a semantically atomic operation. As a result of such node-node or edge-edge mapping, some attributes on the target node/edge may need to be changed to have the same value as corresponding attributes on the conceptual node/edge, or to satisfy attribute value constraints specified in the realization pattern 114, e.g., deployment pattern (conceptual) topology. If such changes are required and corresponding attributes on the target node/edge can be modified (i.e., they are mutable), they need to be performed for the mapping to be fully valid. If corresponding attributes on the target node/edge can not be modified (i.e., they are immutable), the mapping is considered to be invalid.

As another example, an attribute mismatch between the deployment pattern 114 and a corresponding target computing environment model 116 may be resolved by a desired configuration change that does not involve adding or installing a new resource or removing (uninstalling) an existing resource. For instance changing a single characteristic of a resource, such as a hostname, may be implemented by a change operation.

Figure 4:
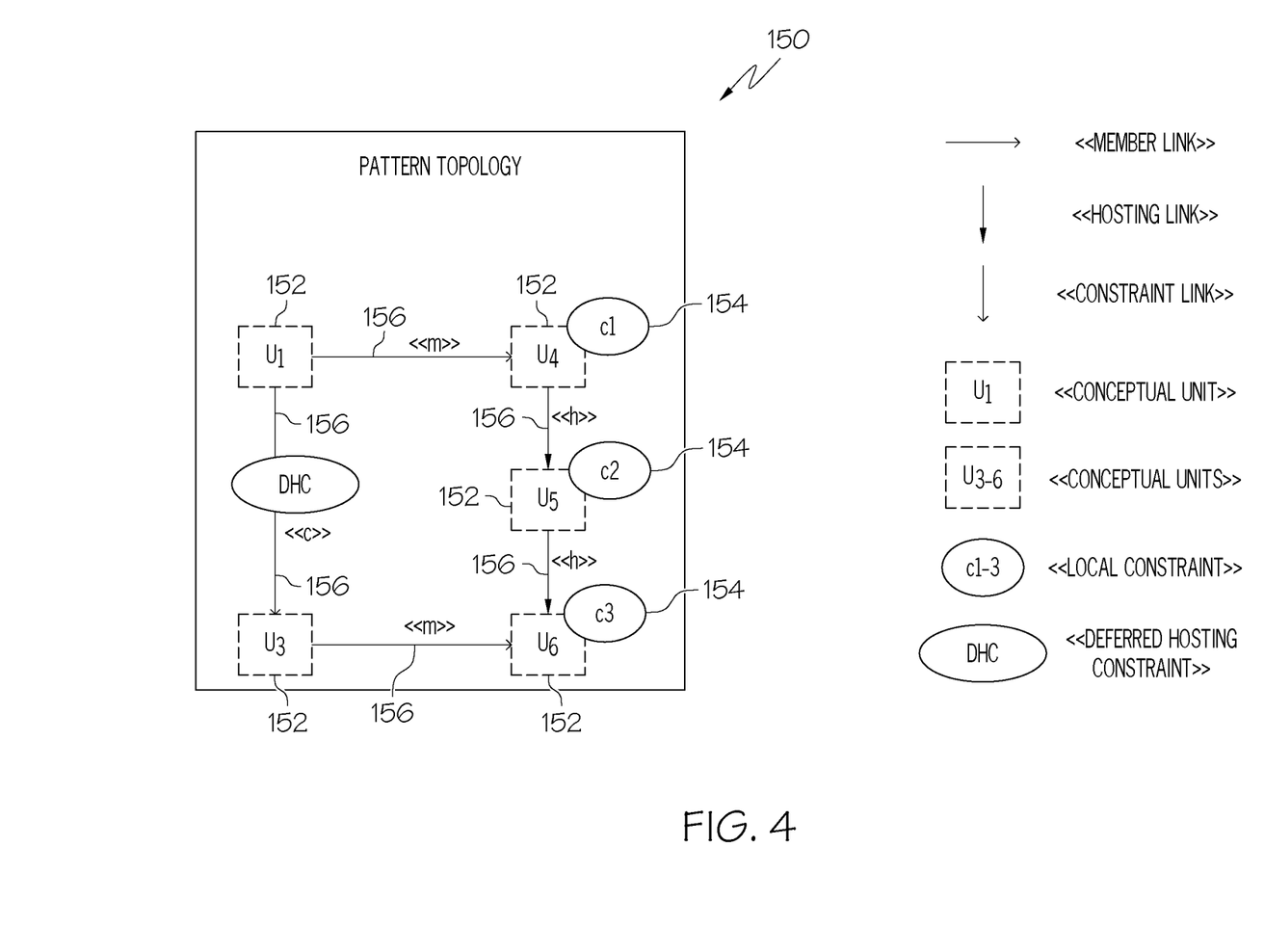
FIG. 4 is a diagram that schematically represents an exemplary deployment pattern according to various aspects of the present invention.

Referring to FIG. 4, a diagram schematically represents an exemplary pattern that may be used for pattern realization according to aspects of the present invention. For purposes of clarity of discussion herein, the illustrated pattern is represented by a deployment pattern topology 150. As used herein, a "topology" is a model that presents a way to describe and categorize modeling elements, e.g., requirements, capabilities, constraints, relationships, and interdependencies that capture the characteristics of a deployment model. The topology also provides a convenient visual representation of a deployment model. As such, the term "topology" as used herein can be used to describe the realization patterns 114 (and other patterns used to create or otherwise define the realization pattern), as well as the target computing environment models 116 that describe target deployment environments.

The illustrated pattern topology 150 is comprised of conceptual units 152 and constraints 154. Links 156 are utilized to connect the conceptual units 152 and constraints 154. As illustrated, the constraint further differentiated with the label "DHC" represents a Deferred Hosting Constraint. In this exemplary configuration, the DHC indicates that the source unit of the constraint link should be eventually hosted, such as through a chain of hosting relationships, on the target unit of the constraint link. The handling of abstract objects through the realization of conceptual objects is set out and described more fully in U.S. patent application Ser. No. 12/141,655, entitled "Topology Modeling Application That Handles Abstract Entities Through The Realization Of Conceptual Objects", filed on Jun. 18, 2008, the disclosure of which is already incorporated by reference in its entirety.

Figure 5:
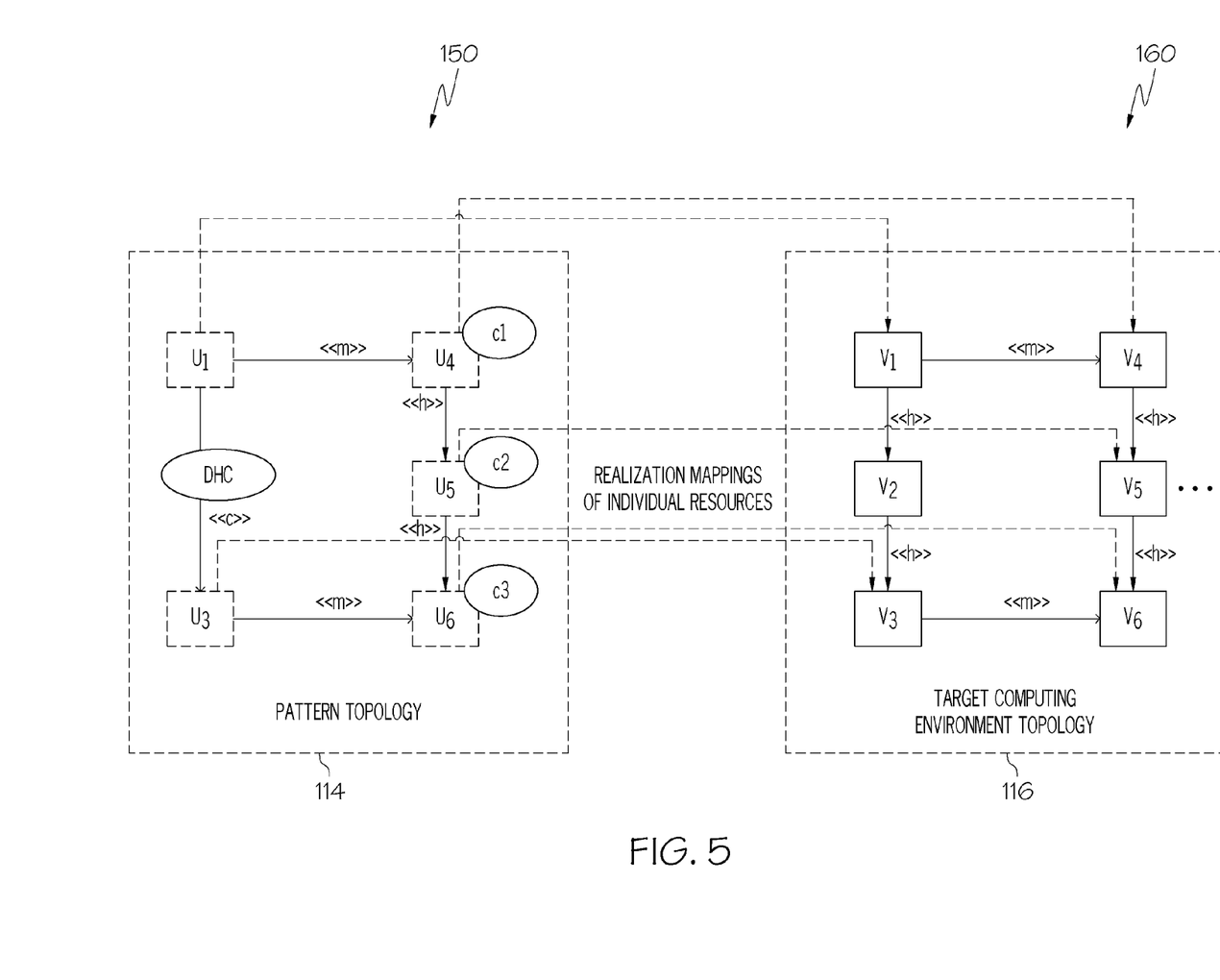
FIG. 5 is a diagram illustrating pattern realization according to aspects of the present invention.

Referring to FIG. 5, an example of pattern realization (matching) process is illustrated according to aspects of the present invention. In this example, the realization engine 126 attempts to match a given pattern graph to a corresponding model graph. This is visually represented in FIG. 5 by illustrating a match of the pattern topology 150 to at least a portion of a corresponding target computing environment model topology 160. Conceptually, the pattern topology 150 defines a realization pattern 114 that is used as a basis for pattern matching determinations by the realization engine 126 against one or more target computing environment models 116, e.g., where an exemplary target computing environment model 116 is illustrated in FIG. 5 by the model topology 160.

In the illustrated example, the realization engine 126 identifies that a match exists between the realization pattern 114 and the corresponding target computing environment model 116. In particular, the pattern topology 150, includes five conceptual units, U1, U3, U4, U5, U6, which can each be matched to a corresponding resource V1, V3, V4, V5, V6 of the associated model topology 160.

Moreover, as illustrated in the present example, in the pattern topology 150, conceptual unit U1 is associated with conceptual unit U4 by a member link. In the model topology 160, a corresponding pattern is found, illustrated as resource V1 associated with resource V4 via a member link <<m>>. As also illustrated, in the pattern topology 150, conceptual unit U4 is associated with conceptual unit U5 via a hosting link <<h>> and conceptual unit U5 is associated with conceptual unit U6 via a hosting link <<h>>. Correspondingly, in the model topology 160, resource V4 is associated with resource V5 via a hosting link <<h>> and resource V5 associated with resource V6 via a hosting link <<h>>.

Still further as illustrated, in the pattern topology 150, conceptual unit U3 is associated with conceptual unit U6 via a member link <<m>>. Correspondingly, in the model topology 160, resource V3 is associated with resource V6 via a member link <<m>>.

Yet further as illustrated, in the pattern topology 150, conceptual unit U1 is associated with conceptual unit U3 via a deferred hosting constraint DHC on the constraint link <<c>>. Correspondingly, in the model topology 160, resource V1 is associated with resource V2 via a hosting link <<h>> and resource V2 associated with resource V3 via a hosting link <<h>>. According to aspects of the present invention, constraints defined in the pattern topology 150 are validated against the target computing environment topology 160. For example, the Deferred Hosting Constraint DHC is valid in the present example, because resource V1 is hosted on resource V2 which is hosted on resource V3.

Library of Reconfiguration Actions:

As will be described in greater detail herein, computing environments may be readily reconfigurable. As such, the pattern matching capabilities according to various aspects of the present invention may also support the use of reconfiguration actions on the computing environment models 116, which can be used by pattern realization algorithms to find a valid pattern realization in a computing environment model modified by certain selected reconfiguration actions. In the example, of FIG. 5, no reconfiguration actions were required on the target computing environment topology 160, in order to find pattern realization (match). However, in certain applications, reconfiguration actions allow for a more robust pattern matching process.

Reconfiguration actions are optional. For example, there may be a requirement to find strict pattern matches, such as pattern matches when there are no reconfiguration actions performed on the target computing environment model.

However, according to aspects of the present invention, reconfiguration actions can be used by realization engine 126, e.g., pattern realization algorithms, to find a valid pattern realization in a computing environment model modified by certain selected reconfigurations. According to various aspects of the present invention, a reconfiguration action may be represented as a function that takes a computing environment model as its input, and produces a modified computing environment model as its output. A reconfiguration action may also define preconditions on the input computing environment model. Thus, for example, a precondition may be set such that the corresponding reconfiguration action is not applicable to every potential computing environment model.

By way of illustration and not by way of limitation, reconfiguration actions may include model modifications that correspond to addition of hardware and/or software resources, e.g., a new server that can be added to the computing environment such as adding an X86 server to the computing environment. Other model modifications that correspond to actions include installing software products, e.g., installing DB2 Database for Windows OS on existing computer or adding a new WebSphere Application Server that can be installed in the computing environment.

Still further examples of model modifications that correspond to reconfiguration actions include adding instantiatable virtual machine images that can contain one or several installed software resources and/or adding configuration elements (units) that represent results of creating a managed resource on existing software or hardware. For example, a model modification may comprise creating a new JDBC Driver Provider in a WebSphere Application server, or adding new configuration entities appearing in the physical computing environment as a result of successful execution of a configuration (management) operation on existing (running) software resource, e.g., creating a new JDBC DataSource on a JDBC Driver Provider in a WebSphere Application server.

Still further examples of model modifications may comprise removing hardware resources, uninstalling software products, removing virtual machine images, removing configuration units that represent managed hardware or software resources, e.g., JDBC Driver Provider in a WebSphere Application Server, reconfiguring managed resources without installing new ones or uninstalling existing ones (e.g., changing JNDI name of a JDBC Datasource) and adding and/or removing and/or reconfiguring relationships between software or hardware resources, e.g., adding a server to a cluster of servers, or removing a server from a cluster of servers, or moving the server to a different cluster of servers.

Reconfiguration actions may also modify the target computing environment itself, and not just the corresponding computing environment model 116. As an example, in configuration management, there is often a conceptual separation between a "authorized state" of the infrastructure, and the discovered (actual) state of the infrastructure. As such, the authorized state and discovered state represent two different models. In other simpler configuration management systems, a change to the model may be automatically accompanied by a change to the modeled infrastructure. Thus, for example, the management software used to implement an "action" may both update the model and change the infrastructure so that it matches the updated model.

In this regard, when performing at least one reconfiguration action that modifies the target computing environment model to evaluate the realization pattern against the target computing environment model, it may be necessary to modify the corresponding model graph to the modified target computing environment model, e.g., where the model graph is implemented distinct from the computing environment model 116 itself. Upon implementing the desired reconfiguration actions, the realization engine 126 re-executes at least one pattern matching algorithm that attempts to match the pattern graph to the modified model graph to identify whether the realization pattern matches to the modified target computing environment model.

By way of illustration, and not by way of limitation, in an exemplary reconfiguration action according to various aspects of the present invention, the computing environment model 116 may be reconfigured by modifying at least one type of existing resource in the target computing environment model and/or by modifying at least one resource itself in the target computing environment model and/or by modifying at least one modeling parameter comprising an attribute/value pair associated with an associated resource or resource-resource relationship in the target computing environment model and/or by modifying containment of at least one resource in other resources in the target computing environment model and/or by modifying at least one or resource-resource relationship between resources in the target computing environment model and/or by adding at least one of resource and or resource-resource relationship to the target computing environment model and/or by removing at least one of a resource and a or resource-resource relationship from the target computing environment model.

Library of Installables:

Certain reconfiguration actions can have a representation that is simpler than a function acting on the space of valid input computing environment topologies. For example, reconfiguration actions that include an addition of one or more new resources to the computing environment model can be represented by an installable, e.g., a deployment topology that contains the model of resources to be added/created by this reconfiguration action. The installable may contain a single node (corresponding to a single resource being added). Additionally, the installable may contain an arbitrarily complex set of nodes and edges connecting the nodes (corresponding to several resources being added and complex interdependencies among them).

According to various aspects of the present invention, a Library of Installables 134 may be provided to organize installables for reconfiguration capabilities. Installables support reconfiguration actions that correspond to additions of new resources to the target computing environment model. Every installable corresponds to a reconfiguration action that comprises of adding the model elements (units and links) that are contained in the installable model, to the target computing environment model. In this regard, the library of installables may provide an approach to account for reconfiguration actions that can be made to physical computing environments in their corresponding models.

Figure 6:
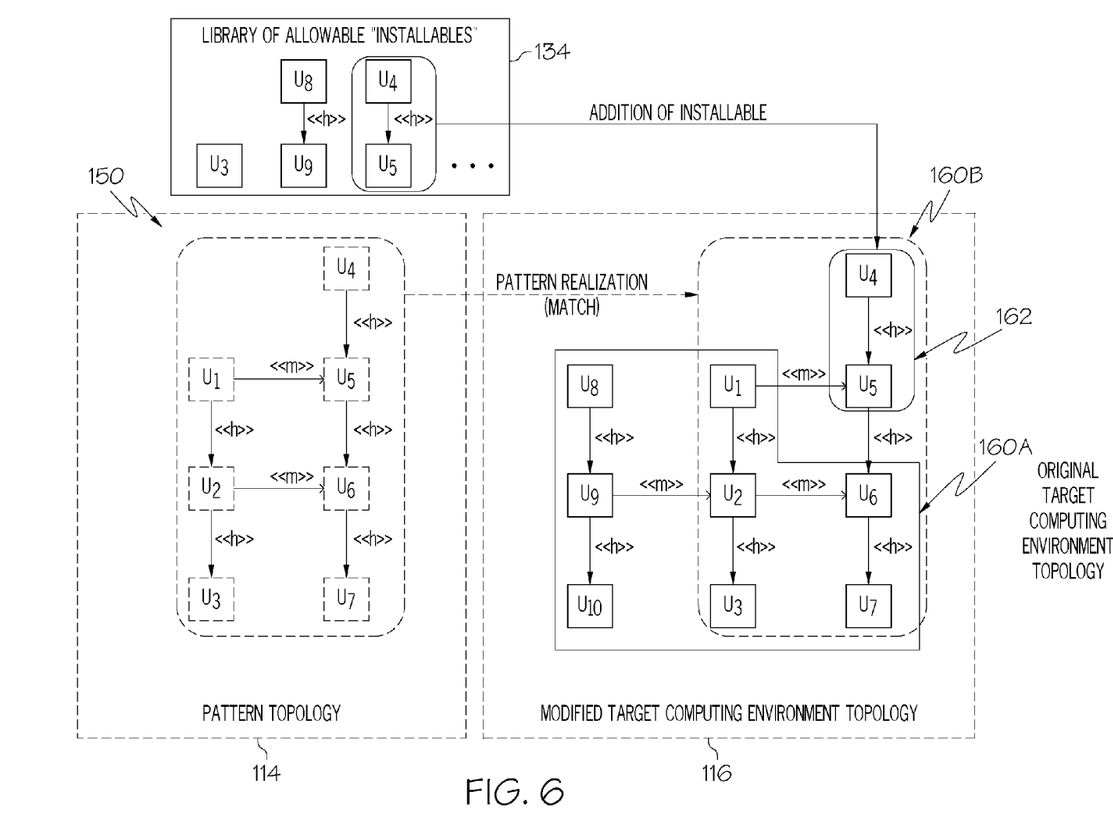
FIG. 6 is a diagram illustrating reconfiguration actions that may be implemented during pattern realization according to aspects of the present invention.

Referring to FIG. 6, a matching operation illustrates the use of a Library of Installables 134 to identify whether a realization pattern 114, which is of interest can be matched to a target computing environment model 116. As illustrated, at least initially, it appears as if the realization pattern 114, which is illustrated as a deployment pattern topology 150, is not realized by the original a target computing environment model 116, e.g., original target deployment infrastructure topology 160A, because conceptual units U4 and U5 of the realization pattern cannot be identified within the original model 116.

However, according to aspects of the present invention, the Library of Installables 134, which may be implemented in any practical manner, may be utilized to discover a "mini topology" 162 comprising target model units U4 and U5 that matches an installable in the Library of Installables 134 and that can be successfully deployed in view of the existing components of the original target deployment infrastructure topology 160A. When the mini topology 162 is combined with the original target deployment infrastructure topology 160A, a modified target deployment infrastructure topology 160B is defined, which matches to the realization pattern 114, in the present example. For example, nodes and edges comprising the conceptual units U1-U7 and their associated hosting and member links of the deployment pattern topology 150 map to corresponding nodes and edges of the target, e.g., the modified target deployment infrastructure topology 160B.

Again, rules, policies and other appropriate techniques may be utilized to determine whether an installable may be integrated with an existing model and where in topology those installables may be located. Still further, as noted in greater detail herein, pattern mapping may be dependent upon one or more rules for local validity of matching of a single resource in the pattern with a single resource in the target computing environment model. Moreover, a set of rules may be utilized to stipulate that global validity of matching of a pattern in a target computing environment model is satisfied.

Graph Isomorphism:

According to various aspects of the present invention, pattern matching may be implemented using (sub)-graph matching algorithms that are applied to solve the deployment pattern realization (matching) problems. In this regard, an evaluation of declarative deployment topology constraints that may exist on the deployment pattern may be implemented, which should be also satisfied by the matching computing environment model. As an illustrative example, pattern matching problems may be solved using (sub)-graph isomorphism and error-correcting sub-graph isomorphism algorithms. That is, pattern matching problems may be formalized as (sub)-graph isomorphism and error-correcting sub-graph isomorphism problems.

By implementing (sub)-graph isomorphism and error-correcting sub-graph isomorphism algorithms, pattern matching capabilities that support the use of reconfiguration actions on the computing environment models may be further enhanced to support reconfiguration actions that represent results of configuration actions on existing installed software as topology elements, e.g., mini-topologies, that can be used as error-correcting additions by the error-correcting sub-graph isomorphism algorithms.

According to aspects of the present invention, a method of deployment pattern matching comprises identifying an input realization pattern for matching and at least one input model to match against. As an illustrative example, a model may comprise a topology that represents an actual target deployment environment or aspects thereof. The topology may also represent yet to be realized environments. Also, as noted in greater detail herein, the realization pattern may comprise a pattern of interest, e.g., a single deployment pattern, a selected part of interest from a single pattern, a composition of one or more patterns or parts thereof, etc.

As noted in greater detail herein, the realization pattern used for pattern matching may be derived by selecting one or more existing patterns, e.g., from a library, and/or by applying modification(s) to the retrieved patterns to achieve a resultant realization pattern. As an example, the realization pattern may be derived from pattern composition and modification to represent the desired state of a computing environment that is of interest.

To further illustrate, assume for example that a realization pattern 114 is desired, which is to be expressed as a deployment pattern topology 150. Using a suitable interface, e.g., the user interface 122 and/or graphical editor 124, a user may select one or more patterns from a library 128 and provide modifications as necessary. Exemplary modification may comprise modification as to the types of existing elements in the realization pattern, e.g., modification of existing node/edge types and/or attribute/value pairs and/or constraints. Other exemplary modifications may comprise additions and or removals of (groups of) model elements and relationships among them, e.g., nodes/edges, additions and/or removals of model constraints, etc. Modifications may further include additions and/or removals of attribute/value pairs on nodes and edges, etc. In this regard, the realization pattern 114, including any implemented modifications is expressed, e.g., captured as a typed (labeled) graph. Moreover, as noted in greater detail herein, the target computing environment model 116 is also expressed, e.g., captured as a typed (labeled) graph.

According to aspects of the present invention, the existence of a set of resources in the target computing environment model 116, e.g., target computing environment topology 160, that match the realization pattern, e.g., deployment pattern topology 150, indicates that conceptual nodes/edges in the pattern topology and corresponding pattern graph map to (are realized by) some nodes/edges in the physical topology and corresponding model graph (respectively). Therefore, the problem of deployment topology matching may be formulated in terms of a modified graph isomorphism problem.

That is, modified graph isomorphism algorithms may be utilized to find possible mapping(s) between the entire pattern, e.g., (conceptual) topology and a subset of resources in the model, e.g., physical infrastructure topology (concrete topology). A number of implementations of different isomorphism algorithms may be utilized. Moreover, as noted in greater detail herein, during the graph matching process, reconfiguration actions may be implemented, e.g., using a Library of Reconfiguration Actions, in an effort to find a valid pattern match.

As an illustrative example, a class of algorithms that may be utilized to implement the pattern matching process described more fully herein may comprise, for example, exact sub-graph isomorphism algorithms, which may be utilized to find exact isomorphic matches of the realization pattern in the target computing environment model, e.g., by identifying exact isomorphic matches of the associated pattern graph in the corresponding model graph. Moreover, algorithms utilized to implement a pattern match may be enhanced with step(s) that validate satisfaction of constraints (specified on the conceptual nodes/edges) against mapped resources in the target computing environment model.

As another illustrative example, a class of algorithms that may be utilized to implement the pattern matching process described more fully herein may comprise, for example, error-correcting sub-graph isomorphism algorithms that handle allowable additions of nodes/edges to the physical infrastructure topology. Error-correcting sub-graph isomorphism algorithms may be used to find an isomorphic match of the realization pattern in the model, e.g., in the physical infrastructure topology. Such error-correcting sub-graph isomorphism algorithms may use the library of installables as the set of allowable error-correction graph additions to transform the corresponding target computing environment model in search of a sub-graph that is isomorphic to the input realization pattern. Error-correcting sub-graph isomorphism algorithms may further be enhanced with the step(s) that validates satisfaction of constraints (specified on the conceptual nodes/edges) against mapped resources in the model.

As an example, error-correcting sub-graph isomorphism algorithms that handle reconfiguration actions, e.g., as viewed as error-correcting graph edit operations may be performed on the model graph corresponding to the target computing environment model 116. In this regard, the algorithms are used to find an isomorphic match of the input pattern graph corresponding to the realization pattern 114, in the model graph. The error-correcting sub-graph isomorphism algorithms may use the Library of Reconfiguration Actions 132 (and/or library of installables 134) as a set of allowable error-correction graph edit operations to the target model 116 to transform the model 116 (and/or corresponding model graph if distinct from the model 116), in search of sub-graphs that are isomorphic to the input realization pattern 114. Further, the algorithms may be enhanced with one or more steps that validate satisfaction of constraints (specified on the conceptual nodes/edges) against mapped resources in the target computing environment model.

According to various aspects of the present invention, using developed primitives, a (sub)-graph isomorphism or an error-correcting sub-graph isomorphism algorithm can be applied to solve the deployment pattern matching problem. Moreover, (sub)-graph isomorphism and error-correcting sub-graph isomorphism algorithms may be enhanced by taking into account any deployment topology model constraints that may exist on the pattern topology, which should be also satisfied by the matching existing computing environment.

As noted in greater detail herein, deployment topology matching may be formulated in terms of graph matching. However, other formulations, such as generic constraint satisfaction, may also be implemented.

According to various aspects of the present invention, the pattern matching capabilities may be able to find locally valid realizations of individual resources. Additionally, the pattern matching capabilities may be able to check that pattern realization is globally valid, e.g., according to rules defining global pattern realization. The pattern matching capabilities may also be able to check that constraints defined in the pattern are satisfied on the target computing environment model.

As noted in greater detail herein various aspects of the present invention provide for the formalization of the broad class of deployment pattern matching problems as modified graph matching problems, e.g., modified (sub)-graph isomorphism or error-correcting sub-graph isomorphism problems. Moreover, various aspects of the present invention provide for the application of modified graph matching algorithms, e.g., (sub)-graph isomorphism and error-correcting sub-graph isomorphism algorithms, to deployment pattern matching problems. In this regard, the modification of graph matching algorithms may be implemented to take into account to the properties of the deployment pattern domain, e.g., global realization validity rules, constraint validation, etc. Moreover, deployment pattern realization is supported, which includes reconfiguration actions applied to the target computing environment model. Thus, reconfigurable actions may be represented, e.g., such as in the form of a library of installables, i.e., mini-topologies that represent the resources that will be added/installed/configured as a result of the reconfiguration action.

Still further, declarative deployment topology constraints may be used on the pattern topology, which should be satisfied by the matching target computing environment model and thus the corresponding computing environment. Also, various aspects of the present invention allow for specification and validation of rules that define the overall validity of a pattern realization, which is additional to validity of realization of individual resources in the pattern topology.

When evaluating the realization pattern against the target computing environment model, various techniques may be implemented to identify matches. For example, an implemented algorithm may find a first match of the realization pattern to the target computing environment model and/or optionally, the modified target computing environment model that was modified based upon one or more reconfiguration actions. As another illustrative example, the implemented algorithm may find all and/or any subset of matches of the realization pattern to the target computing environment model and/or optionally, the modified target computing environment model that was modified based upon one or more reconfiguration actions.

The pattern matching algorithms according to various aspects of the present invention do not need to be deterministic. Rather, as an example, a pattern matching algorithm may be designed to find pattern realizations in certain cases of input pattern and target computing environment models. As such, it is possible that an implemented algorithm will not always find pattern realization(s) if it (they) exist(s).

Figure 7:
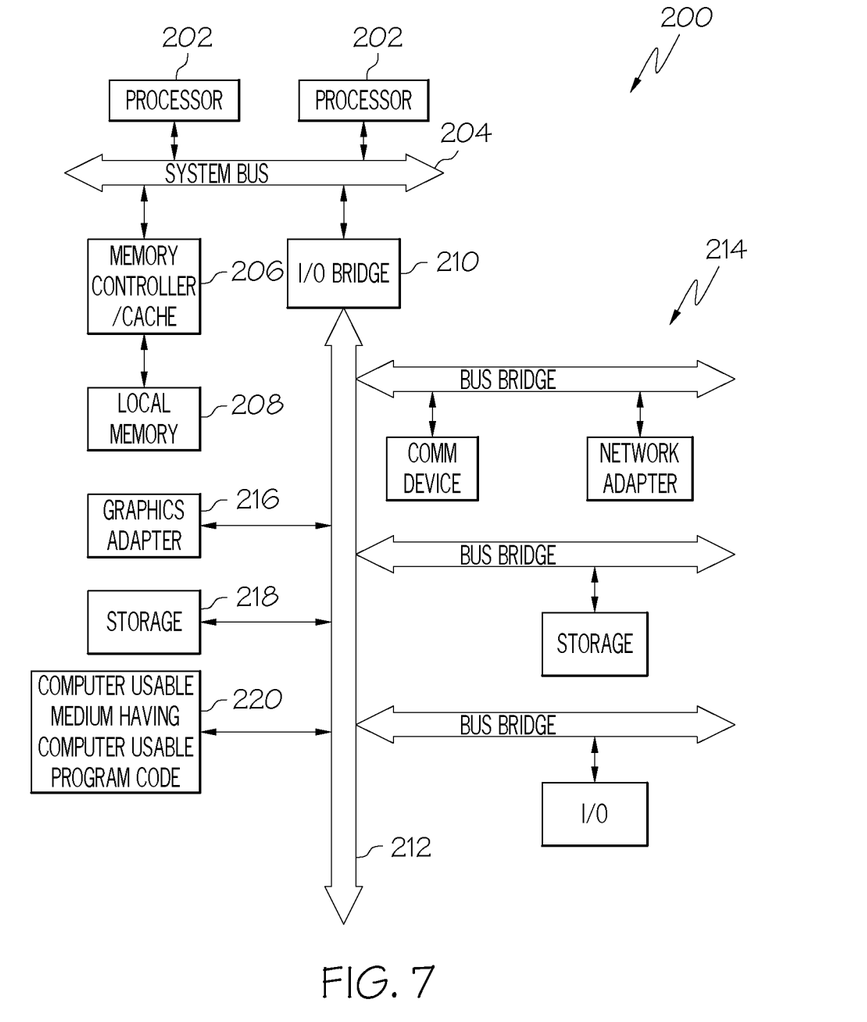
FIG. 7 is a block diagram of an exemplary computer system including a computer usable medium having computer usable program code embodied therewith, where the exemplary computer system is capable of executing a computer program product to implement pattern realization according to various aspects of the present invention set out in greater detail herein.

Referring to FIG. 7, a block diagram of a data processing system is depicted in accordance with the present invention. Data processing system 200, such as one of the processing devices described herein, may comprise a symmetric multi-processor (SMP) system or other configuration including a plurality of processors 202 connected to system bus 204. Alternatively, a single processor 202 may be employed. Also connected to system bus 204 is memory controller/cache 206, which provides an interface to local memory 208. An I/O bridge 210 is connected to the system bus 204 and provides an interface to an I/O bus 212. The I/O bus may be utilized to support one or more busses and corresponding devices 214, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 216, storage 218 and a computer usable storage medium 220 having computer usable program code embodied thereon. The computer usable program code may be executed to execute any aspect of the present invention, for example, to implement aspects of any of the methods and/or system components illustrated in FIGS. 1-6. Moreover, the computer usable program code may be utilized to implement various aspects of pattern realization as set out further herein.

The data processing system depicted in FIG. 7 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out various aspects of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of implementing deployment pattern matching within models of computing environment, comprising:
   accessing a target computing environment model that electronically captures environment modeling parameters relating to resources and resource-resource relationships of a corresponding computing environment;
   expressing the target computing environment model as a model graph defined by target resource elements and resource-to-resource relationship links;
   accessing a realization pattern that electronically captures deployment parameters relating to resources and resource-resource relationships of a deployment of interest;
   expressing the realization pattern as a pattern graph defined by conceptual resource elements and constraints arranged by resource-to-resource relationship links and constraint links;
   defining at least one of the following:
      local realization rules that characterize local validity of matching a single resource in the realization pattern with a corresponding single resource in the target computing environment model;
      global realization rules for global validity of matching the realization pattern against the target computing environment model, and
      constraint rules for validating model constraints defined on the realization pattern against resources in the target computing environment model;
   utilizing a processing device to evaluate the realization pattern against the target computing environment model by executing at least one pattern matching algorithm that attempts to match the pattern graph to the model graph and utilizing at least one of the local realization rules, global realization rules and constraint rules to determine whether the realization pattern matches to the target computing environment model; and conveying information corresponding to results of the evaluation.

2. The method according to claim 1, wherein utilizing a processing device to evaluate the realization pattern against the target computing environment model further comprises:

performing at least one reconfiguration action that modifies the target computing environment model;

modifying the model graph corresponding to the modified target computing environment model; and re-executing at least one pattern matching algorithm that attempts to match the pattern graph to the modified model graph to identify whether the realization pattern matches to the modified target computing environment model.

3. The method according to claim 2, wherein performing at least one reconfiguration action comprises performing at least one of:

modifying at least one type of existing resource in the target computing environment model;

modifying at least one resource itself in the target computing environment model;

modifying at least one modeling parameter comprising an attribute/value pair associated with an associated resource or resource-resource relationship in the target computing environment model;

modifying containment of at least one resource in other resources in the target computing environment model;

modifying at least one resource-resource relationship between resources in the target computing environment model;

adding at least one of resource and or resource-resource relationship to the target computing environment model; and removing at least one of a resource and a resource-resource relationship from the target computing environment model.

4. The method according to claim 2, wherein:

utilizing at least one pattern matching algorithm comprises implementing a pattern matching algorithm wherein:

the implemented algorithm handles allowable reconfiguration actions that are viewed as graph edit operations performed on the model graph; and the implemented pattern matching algorithm is used to find an isomorphic match of the pattern graph in the model graph corresponding to a match of the realization pattern in the target computing environment model; and performing at least one reconfiguration action comprises utilizing at least one allowable reconfiguration action in a set of allowable graph edit operations to the model graph to transform the model graph in search of a subgraph that is isomorphic to the pattern graph.

5. The method according to claim 2, wherein performing at least one reconfiguration action comprises:

accessing a library of allowable reconfiguration actions that can be performed on resources or resource-resource relationships of the target computing environment model;

utilizing the accessed library of allowable reconfiguration actions to modify the target computing environment model; and modifying the model graph to correspond to the modified target computing environment model.

6. The method according to claim 2, wherein utilizing a processing device to evaluate the realization pattern against the target computing environment model further comprises:

implementing an algorithm to perform at least one of:

attempting to find a first match of the realization pattern to at least one of: the target computing environment model and the modified target computing environment model that was modified based upon one or more reconfiguration actions;

attempting to find all matches of the realization pattern to at least one of: the target computing environment model and the modified target computing environment model that was modified based upon one or more reconfiguration actions; and attempting to find more than the first match and not all matches to at least one of the target computing environment model and the modified target computing environment model that was modified based upon one or more reconfiguration actions.

7. The method according to claim 1, wherein utilizing at least one pattern matching algorithm comprises:

implementing a pattern matching algorithm within a class of algorithms that find exact pattern matches, wherein:

the implemented algorithm is used to find exact matches of the pattern graph in the model graph.

8. The method according to claim 1, wherein accessing a realization pattern comprises at least one of: a predetermined information technology solution template, part of a predetermined information technology solution template, a composition of several information technology solution templates, and a composition of at least parts of several information technology solution templates.

9. The method according to claim 1, wherein the realization pattern specifies a selected one of:

a compliance policy as a deployment pattern, further comprising checking compliance of the infrastructure by matching the compliance policy against the target computing environment model; and information technology solution deployment requirements and constraints, further comprising verifying that the deployment requirements and constraints are satisfied against the target computing environment model that models the infrastructure where the information technology solution will deployed.

* * * * *